(12) United States Patent
Speyer

(10) Patent No.: US 7,907,381 B2
(45) Date of Patent: Mar. 15, 2011

(54) PROTECTION CIRCUIT FOR A SUBSCRIBER LINE INTERFACE CIRCUIT

(75) Inventor: Christopher James Speyer, Spicewood, TX (US)

(73) Assignee: Zarlink Semiconductor (US) Inc., Austin, TX (US)

(*) Notice: Subject to any disclaimer, the term of this patent is extended or adjusted under 35 U.S.C. 154(b) by 450 days.

(21) Appl. No.: 12/046,642

(22) Filed: Mar. 12, 2008

(65) Prior Publication Data

US 2009/0231768 A1      Sep. 17, 2009

(51) Int. Cl.
*H01C 7/12* (2006.01)
(52) U.S. Cl. ........................................................ 361/119
(58) Field of Classification Search ............... 361/119
See application file for complete search history.

(56) References Cited

U.S. PATENT DOCUMENTS

| | | | | |
|---|---|---|---|---|
| 4,661,878 A | * | 4/1987 | Brown et al. ............. | 361/56 |
| 4,700,380 A | * | 10/1987 | Ahuja ..................... | 379/177 |
| 4,849,846 A | * | 7/1989 | Hung et al. .............. | 361/56 |
| 5,195,130 A | * | 3/1993 | Weiss et al. .............. | 379/93.19 |
| 5,493,469 A | * | 2/1996 | Lace ....................... | 361/119 |
| 5,781,392 A | * | 7/1998 | Clark ...................... | 361/111 |
| 6,017,778 A | * | 1/2000 | Pezzani ................... | 438/138 |
| 6,075,277 A | * | 6/2000 | Pezzani ................... | 257/499 |
| 6,421,220 B2 | * | 7/2002 | Kobsa ..................... | 361/120 |
| 6,583,496 B2 | * | 6/2003 | Galtie et al. ............. | 257/601 |
| 6,606,231 B2 | * | 8/2003 | Rumer ..................... | 361/119 |
| 6,882,514 B2 | * | 4/2005 | Mutunga et al. .......... | 361/119 |
| 7,375,942 B1 | * | 5/2008 | Harris ..................... | 361/119 |
| 7,489,488 B2 | * | 2/2009 | Vos et al. ................ | 361/91.5 |
| 2002/0075623 A1 | * | 6/2002 | Maytum et al. .......... | 361/119 |
| 2009/0296300 A1 | * | 12/2009 | Casey ..................... | 361/119 |

* cited by examiner

*Primary Examiner* — Jared J Fureman
*Assistant Examiner* — Christopher J Clark
(74) *Attorney, Agent, or Firm* — Williams, Morgan & Amerson

(57) ABSTRACT

The present invention provides a protection circuit coupled to a tip lead and a ring lead in a subscriber line interface circuit formed on a silicon substrate. The protection circuit includes first and second diodes formed on the silicon substrate and coupled to the tip lead and the ring lead, respectively. The first and second diodes are configured to provide a path from the tip lead or the ring lead to ground in response to a positive voltage at the tip lead or the ring lead. The protection circuit also includes a silicon-controlled rectifier formed on the silicon substrate and configured to provide, in response to a negative voltage at the tip lead or the ring lead, a path from the tip lead or the ring lead to ground via the silicon-controlled rectifier.

12 Claims, 3 Drawing Sheets

PROTECTION CIRCUIT FOR A SUBSCRIBER LINE INTERFACE CIRCUIT

CROSS REFERENCE TO RELATED APPLICATIONS

This application is related to Ser. No. 12/046,683 entitled, "An Optically Triggered Electro-Static Discharge Protection Circuit," by Thomas J. Krutsick filed on Mar. 12, 2008.

BACKGROUND OF THE INVENTION

1. Field of the Invention

This invention relates generally to subscriber line interface circuits, and, more particularly, to implementing protection in subscriber line interface circuits.

2. Description of the Related Art

Conventional telephones receive signals from the network over a loop formed using two wires that are referred to as the tip line and the ring line. The subscriber line interface circuit provides an interface between the two wire (twisted-pair) loop and the four wire ground referenced low-voltage switch environment supported by the network. The subscriber line interface circuit is vulnerable to power surges such as those caused by lightning strikes because the subscriber line interface circuit is electrically coupled to the phone loop, which is exposed to the environment. The subscriber line interface circuit must therefore be able to withstand the surges of energy that are produced by lightning strikes and other disturbances. Conventional subscriber line interface circuits include a separate protection circuit coupled to each tip lead and a separate protection circuit couple to each ring lead.

FIG. 1 conceptually illustrates a conventional subscriber line interface circuit 100 that includes separate protection circuits 105(1-2) coupled to the tip lead 110 and the ring lead 115, respectively. In the interest of clarity, the indices (1-2) may be dropped when referring to the protection circuits 105 collectively. This convention may also be used with other elements shown in the drawings and referenced by a numeral and one or more distinguishing indices. Each protection circuit 105 includes a silicon-controlled rectifier or thyristor 120 coupled in series with a diode 125, as well as resistors 130 that are coupled in parallel with the thyristor 120 and the diode 125. The gates of the thyristors 120 are coupled to a control circuit (TA) 135, which is coupled to a battery that is housed at the telephone office and which provides a voltage (VBAT) that is typically set at approximately −48 V. The gates of the thyristors 120 are also coupled to the diode 125 via resistors 130(2, 4). In operation, the protection circuits 105 protect the subscriber line interface circuit 100 by dumping energy from power surges to ground via the thyristor(s) 120 and/or the diode(s) 125.

Utilizing a different protection circuit 105 for the tip lead 110 and the ring lead 115 has a number of drawbacks. For example, the area of the wafer that is consumed by the protection circuits 105 increases in proportion to the number of tips/ring leads 110, 115 when the protection circuits 105 are formed on silicon wafers or substrates. For another example, I/O pads or pins are required to test each of the protection circuits 105 formed on a die and so using a larger number of protection circuits 105 requires a larger number of tests I/O pads or pins. Consequently, conventional protection circuits 105 are not integrated with the subscriber line interface chip.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, a protection circuit coupled to a tip lead and a ring lead in a subscriber line interface circuit is provided. The subscriber line interface circuit is formed on a silicon substrate. The protection circuit includes first and second diodes formed on the silicon substrate and coupled to the tip lead and the ring lead, respectively. The first and second diodes are configured to provide a path from the tip lead or the ring lead to ground in response to a positive voltage at the tip lead or the ring lead. The protection circuit also includes a silicon-controlled rectifier formed on the silicon substrate and configured to provide, in response to a negative voltage at the tip lead or the ring lead, a path from the tip lead or the ring lead to ground via the silicon-controlled rectifier.

In another embodiment of the instant invention, a method of forming a protection circuit coupled to a tip lead and a ring lead in a subscriber line interface circuit is provided. The method includes forming the subscriber line interface circuit on a silicon substrate. The subscriber line interface circuit is configured to be coupled to a silicon-controlled rectifier configured to provide, in response to a negative voltage at the tip lead or the ring lead, a path from the tip lead or the ring lead to ground via the silicon-controlled rectifier. The method also includes forming first and second diodes on the silicon substrate. The first and second diodes are coupled to the tip lead and the ring lead, respectively. The first and second diodes are configured to provide a path from the tip lead or the ring lead to ground in response to a positive voltage at the tip lead or the ring lead.

In yet another embodiment of the instant invention, a protection circuit coupled to a plurality of subscriber line interface circuits is provided. Each subscriber line interface circuit is formed on a silicon substrate and includes a tip lead and a ring lead. The protection circuit includes a plurality of diodes including a first diode coupled to each tip lead and a second diode coupled to each ring lead. The first and second diodes are formed on the silicon substrate and configured to provide a path from each tip lead or ring lead to ground in response to a positive voltage at the tip lead or the ring lead. The protection circuit also includes a silicon-controlled rectifier formed on the silicon substrate and configured to provide, in response to a negative voltage applied to at least one tip lead or ring lead, a path from the tip lead or the ring lead to ground via the silicon-controlled rectifier.

BRIEF DESCRIPTION OF THE DRAWINGS

The invention may be understood by reference to the following description taken in conjunction with the accompanying drawings, in which like reference numerals identify like elements, and in which.

Figure 1:
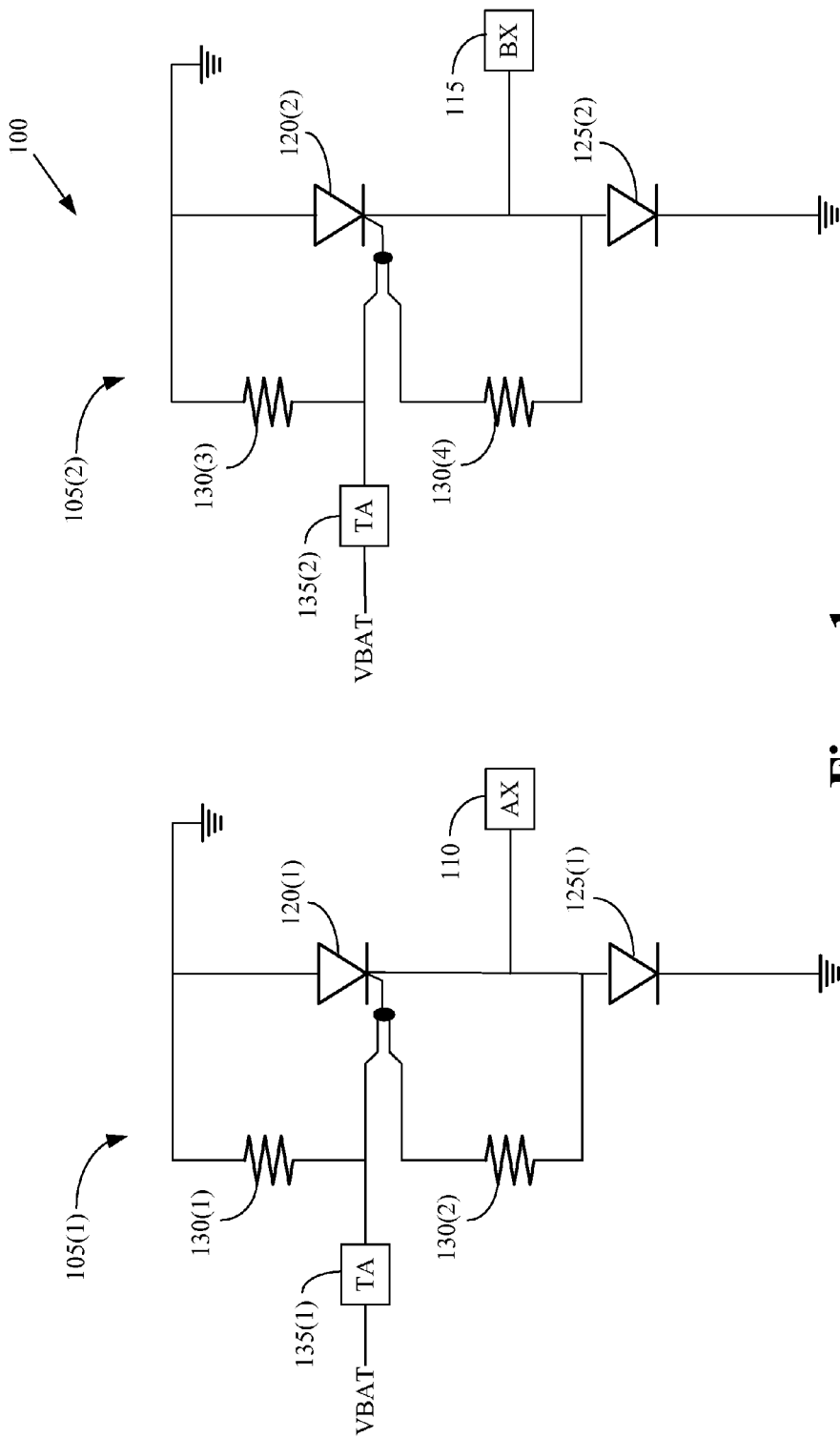
FIG. 1 conceptually illustrates a conventional subscriber line interface circuit that includes separate protection circuits coupled to the tip lead and the ring lead, respectively.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
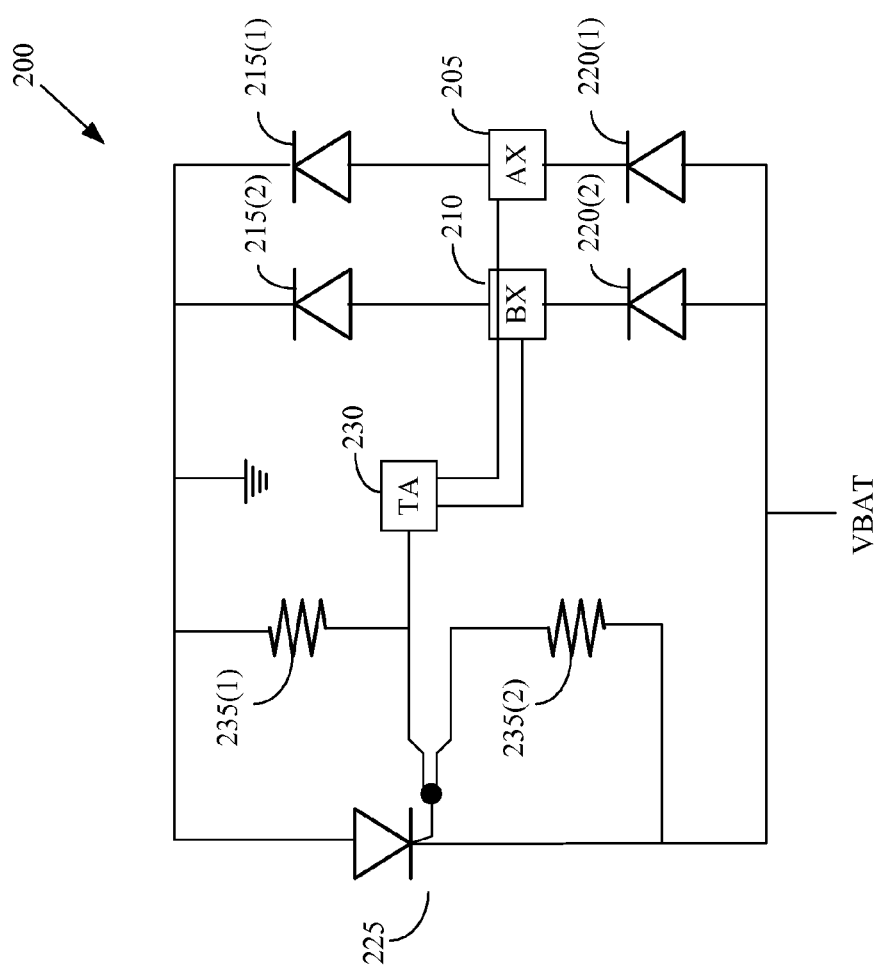
FIG. 2 conceptually illustrates a first exemplary embodiment of a subscriber line interface circuit that includes a protection circuit coupled to a tip lead and a ring lead, in accordance with the present invention.

FIG. 2 conceptually illustrates a first exemplary embodiment of a subscriber line interface circuit 200 that includes a protection circuit coupled to a tip lead 205 and a ring lead 210. In the illustrated embodiment, a first pair of diodes 215(1-2) are coupled between ground and the tip lead 205 and ring lead 210, respectively. In the interest of clarity, the indices (1-2) may be dropped when referring to the diodes 215 collectively. This convention may also be used with other elements shown in the drawings and referenced by a numeral and one or more distinguishing indices. The diodes 215 are oriented so that they are forward biased when the voltage at the tip lead 205 and/or the ring lead 210 is positive. A second pair of diodes 220 is coupled between a battery voltage (VBAT) and the tip lead 205 and the ring lead 210. The battery voltage is provided by a switching regulator. The second pair of diodes 220 is oriented so that they are reverse biased when the voltage at the tip lead 205 and/or the ring lead 210 is higher than the voltage provided by the battery. For example, the battery voltage may be −48 volts so that the diodes 220 are forward biased when the voltage at the tip lead 205 and/or the ring lead 210 is smaller (i.e., more negative in the present embodiment) than −48 V.

The protection circuit includes a silicon-controlled rectifier 225 that is coupled between the ground node and the battery voltage node. In the illustrated embodiment, the protection circuit includes a control circuit (TA) 230 that can generate a control signal that is used to turn on the silicon-controlled rectifier 225 so that it provides a conductive path between the diodes 220 and the ground node. For example, the control circuit 230 may generate a signal in response to detecting a voltage surge at either the tip lead 205 or the ring lead 210. The signal may have a voltage that causes the silicon-controlled rectifier 225 to enter a conductive state, e.g., the voltage of the control signal may exceed an internal reference voltage of the silicon-controlled rectifier 225. Alternatively, the protection circuit may not include a control circuit 230 and the silicon-controlled rectifier 225 may receive signals directly from the tip lead 205 and/or the ring lead 210.

The silicon controlled rectifier 225 may include internal resistance, which can be represented by resistors 235. However, persons of ordinary skill in the art having benefit of the present disclosure should appreciate that the resistors 235 may alternatively represent actual circuit elements. For example, in one embodiment, the protection circuit may also include a plurality of resistors 235 that may be configured to limit current traveling through the silicon-controlled rectifier 225. The number and/or resistance of the resistors 235 is a matter of design choice and may be selected based upon the desired performance of the protection circuit and/or the operating parameters of the silicon-controlled rectifier 225. Persons of ordinary skill in the art having benefit of the present disclosure should appreciate that the protection circuit and/or the subscriber line interface circuit 200 may include additional elements that are not depicted in FIG. 2.

In operation, the subscriber line interface circuit 200 may operate in a steady-state mode that corresponds to normal operation of the telephone system. The voltage of the switch regulator VBAT is typically set to −48 V for operations such as talking. During these types of operations, the voltages at the tip lead 205 and the ring lead 210 are typically within the range of −1 V to approximately −30 V. When the telephone system is in the ringing mode, the voltages at the tip lead 205 and the ring lead 210 are typically in the range −90 to −130V and the voltage at the switch regulator is increased to approximately −140 V. Alternatively, two switch regulators (not shown in FIG. 2) may be used to provide the high and low voltages that are used during ringing and talking, respectively. Since the magnitude of the (negative) switch regulator voltage is larger than the magnitude of the (negative) voltages at the tip lead 205 and/or the ring lead 210 during steady-state operation, the diodes 215, 220 are reverse biased in the steady-state and do not conduct. The silicon-controlled rectifier 225 is also in the OFF (or non-conductive) state during normal steady-state operation of the subscriber line interface circuit 200.

The subscriber line interface circuit 200 may also operate in a protected mode that corresponds to some unusual or unexpected event, such as a lightning strike. For example, a lightning strike within the telephone network may generate large voltages and/or currents that are potentially destructive to the subscriber line interface circuit 200. The protection circuit therefore operates to shunt these currents to ground before they have an opportunity to cause any damage to the subscriber line interface circuit 200. For example, if a positive voltage is detected at either the tip lead 205 or the ring lead 210, the corresponding diode 215 becomes forward biased and provides a conducting path between ground and the tip lead 205 and/or the ring lead 210. For another example, if a negative voltage that has a magnitude larger than VBAT is detected at either the tip lead 205 for the ring lead 210, one or more of the diodes 220, forward biased and provide a conducting path between the VBAT node and the tip lead 205 and/or the ring lead 210. The negative voltage at the tip lead 205 and/or the ring lead 210 may also cause the silicon-controlled rectifier 225 to enter the ON (or conductive) state. In the embodiments that include the control circuit 230, the control circuit 230 provides a control signal that is used to turn on the silicon-controlled rectifier 225 when the negative voltage exceeds a threshold level. Alternatively, the silicon-controlled rectifier 225 may be coupled directly to the tip lead 205 and the ring lead 210 so that it turns on in response to the negative voltage applied to the tip lead 205 and/or the ring lead 210. Once the silicon-controlled rectifier 225 enters the conducting state, current may travel from the tip lead 205 and/or the ring lead 210 through the silicon-controlled rectifier 225 and diodes 220 and on to ground, thereby protecting the subscriber line interface circuit 200.

The subscriber line interface circuit 200 (including the tip lead 205 and the ring lead 210) can be fabricated on a silicon wafer or substrate using conventional fabrication techniques. In one embodiment, portions of the protection circuit can be formed on the silicon substrate that supports the subscriber line interface circuit 200, a tip lead 205, and the ring lead 210. For example, the diodes 215, 220, the subscriber line interface circuit 200, the tip lead 205, and the ring lead 210 may all be formed on the same silicon substrate. Additional elements from the protection circuit may also be integrated into the substrate that holds the diodes 215, 220 and the subscriber line interface circuit 200. For example, the control circuit 230 (if present) can be integrated onto the substrate. Similarly, the silicon-controlled rectifier 225 may also be integrated onto the substrate that includes the subscriber line interface circuit 200.

The subscriber line interface circuit 200 and the protection circuit described herein have a number of advantages over conventional practice. For example, using a single protection circuit for both the tip lead 205 and the ring lead 210 may reduce the substrate area consumed by the protection circuit by as much as one half, resulting in smaller and/or cheaper dies. For example, the two silicon-controlled rectifiers 120 used in a conventional protection circuit may be replaced by a single silicon-controlled rectifier 225 and two diodes 220. Diodes are easier and less costly to fabricate than silicon-controlled rectifiers and so this results in a net savings. In embodiments that implement a protection circuit that is separate from the subscriber line interface circuit 200, this allows a single external protector circuit to be used for each subscriber line interface circuit 200. Furthermore, in embodiments that implement the subscriber line interface circuit 200 and portions of the protection circuit on the same silicon substrate, the diodes 215, 220 and the silicon-controlled rectifier 225 may be formed in separate regions of the substrate so that they can be tested independently. This may reduce the risk of a subscriber line interface circuit test damaging the silicon-controlled rectifier 225 and vice versa.

Figure 3:
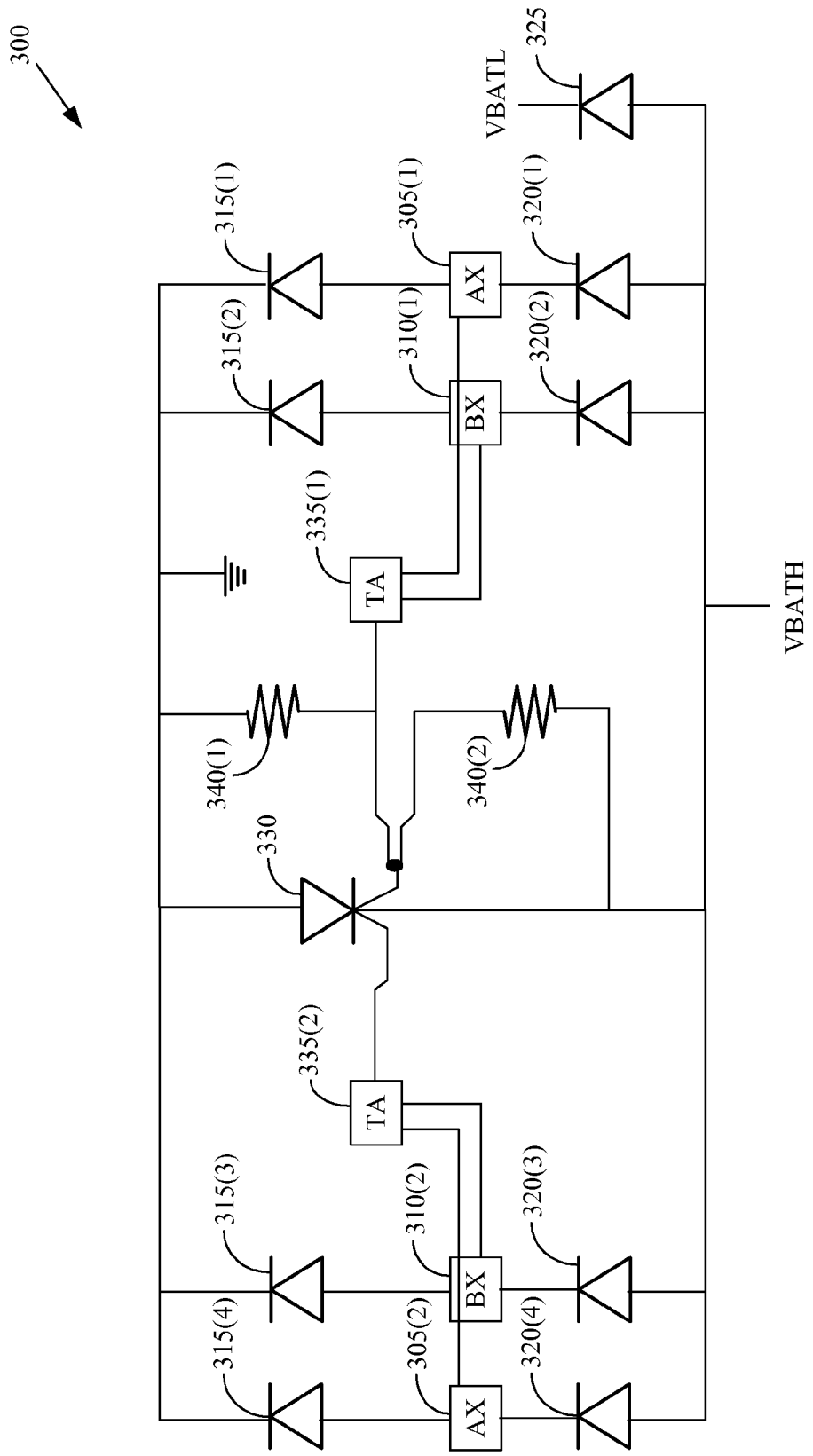
FIG. 3 conceptually illustrates a second exemplary embodiment of a subscriber line interface circuit that includes a protection circuit coupled to a plurality of tip leads and a plurality of ring leads, in accordance with the present invention.

FIG. 3 conceptually illustrates a second exemplary embodiment of a circuit 300 that includes multiple subscriber line interface circuits protected by a single protection circuit. Each subscriber line interface circuit includes a plurality of tip leads 305 and a plurality of ring leads 310. In the illustrated embodiment, each tip lead 305 and ring lead 310 are coupled to ground by a first pair of diodes 315. The diodes 315 are oriented so that they are forward biased when the voltage at the corresponding tip lead 305 or ring lead 310 is positive. A second pair of diodes 320 is coupled between a high battery voltage (VBATH) and each tip lead 305 and ring lead 310. The second pair of diodes 320 is oriented so that they are reverse biased when the voltage at the corresponding tip lead 305 and/or ring lead 310 is higher than the voltage provided by the battery. In the illustrated embodiment, a diode 325 is used to couple the high battery voltage to a low battery voltage (VBATL). The high and low battery voltages may be used during ringing and talking, as discussed herein. However, in alternative embodiments, a single switch regulator that can change from high to low voltage may be used in place of the two voltage nodes shown in FIG. 3.

The protection circuit includes a silicon-controlled rectifier 330 that is coupled between the ground node and the battery voltage node. In the illustrated embodiment, the protection circuit includes control circuits (TA) 335 that can generate control signals that are used to turn on the silicon-controlled rectifier 330 so that it provides a conductive path between the diodes 320 and the ground node. For example, the control circuits 335 may generate a signal in response to detecting a voltage surge at any one of the tip leads 305 or the ring leads 310. Alternatively, the protection circuit may not include the control circuits 335 so that the silicon-controlled rectifier 330 may receive signals directly from the tip leads 305 and/or the ring leads 310. In either case, the silicon-controlled rectifier 330 provides a single pathway that may be used to protect multiple subscriber line interface circuits.

In one embodiment, the protection circuit may also include a plurality of resistors 340 that may be configured to limit current traveling through the silicon-controlled rectifier 330. The number and/or resistance of the resistors 340 is a matter of design choice and may be selected based upon the desired performance of the protection circuit and/or the operating parameters of the silicon-controlled rectifier 335. Persons of ordinary skill in the art having benefit of the present disclosure should appreciate that the protection circuit and/or the circuit 300 may include additional elements that are not depicted in FIG. 3.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A protection circuit coupled to a tip lead and a ring lead in a subscriber line interface circuit formed on a silicon substrate, the protection circuit comprising:

first and second diodes formed on the silicon substrate and coupled to the tip lead and the ring lead. respectively, the first and second diodes configured to provide a path from the tip lead or the ring lead to ground in response to a positive voltage at the tip lead or the ring lead:

a silicon-controlled rectifier formed on the silicon substrate and configured to provide a path from the tip lead to ground via the silicon-controlled rectifier in response to a negative voltage at the tip lead and a path from the ring lead to ground via the silicon-controlled rectifier in response to a negative voltage at the ring lead; and third and fourth diodes formed on the silicon substrate and coupled in series with the first and second diodes and the tip lead and the ring lead, respectively, the third and fourth diodes configured to be coupled to a battery voltage so that the third and fourth diodes are reversed biased during steady-state operation of the subscriber line interface circuit.

2. The protection circuit of claim 1, comprising a control circuit formed on the silicon substrate and configured to generate a control signal in response to the negative voltage exceeding the magnitude of the battery voltage.

3. The protection circuit of claim 2, wherein the silicon-controlled rectifier provides a path from the tip lead or the ring lead to ground when the magnitude of the negative voltage exceeds the magnitude of the battery voltage.

4. The protection circuit of claim 3, wherein the silicon-controlled rectifier provides a path from the tip lead or the ring lead to ground in response to receiving the control signal from the control circuit.

5. The protection circuit of claim 4, wherein the silicon-controlled rectifier provides a path from the tip lead or the ring lead to ground in response to receiving a control signal at a voltage that has a magnitude that exceeds a magnitude of an internal reference voltage of the silicon-controlled rectifier.

6. A method of forming a protection circuit coupled to a tip lead and a ring lead in a subscriber line interface circuit, comprising:
   forming the subscriber line interface circuit on a silicon substrate, wherein the subscriber line interface circuit is configured to be coupled to a silicon-controlled rectifier configured to provide a path from the tip lead to ground via the silicon-controlled rectifier in response to a negative voltage at the tip lead and a path from the ring lead to ground via the silicon-controlled rectifier in response to a negative voltage at the ring lead;
   forming first and second diodes on the silicon substrate, the first and second diodes being coupled to the tip lead and the ring lead, respectively, the first and second diodes configured to provide a path from the tip lead or the ring lead to ground in response to a positive voltage at the tip lead or the ring lead; and
   forming third and fourth diodes on the silicon substrate, the third and fourth diodes being coupled in series with the first and second diodes and the tip lead and the ring lead, respectively, the third and fourth diodes configured to be coupled to a battery voltage so that the third and fourth diodes are reversed biased during steady-state operation of the subscriber line interface circuit.

7. The method of claim 6, comprising forming a control circuit on the silicon substrate, the control circuit configured to generate a control signal in response to the negative voltage exceeding the magnitude of the battery voltage, wherein the silicon-controlled rectifier provides a path from the tip lead or the ring lead to ground in response to receiving the control signal from the control circuit.

8. A protection circuit coupled to a plurality of subscriber line interface circuits formed on a silicon substrate, each subscriber line interface circuit including a tip lead and a ring lead, the protection circuit comprising:
   a plurality of diodes formed on the silicon substrate and comprising a first diode coupled to each tip lead and a second diode coupled to each ring lead, the first and second diodes configured to provide a path from each tip lead or ring lead to ground in response to a positive voltage at the tip lead or the ring lead;
   a silicon-controlled rectifier formed on the silicon substrate and configured to provide a path from each tip lead to ground via the silicon-controlled rectifier in response to a negative voltage applied to the tip lead and a path from each ring lead to ground via the silicon-controlled rectifier in response to a negative voltage applied to the ring lead: and
   third and fourth diodes formed on the silicon substrate and coupled in series with each first and second diode and each tip lead and ring lead, respectively, the third and fourth diodes configured to be coupled to a battery voltage so that the third and fourth diodes are reversed biased during steady-state operation of the subscriber line interface circuit.

9. The protection circuit of claim 8, comprising a plurality of control circuits formed on the silicon substrate and configured to generate control signals in response to the negative voltage exceeding the magnitude of the battery voltage.

10. The protection circuit of claim 9, wherein the silicon-controlled rectifier provides a path from at least one tip lead or ring lead to ground when the magnitude of the negative voltage exceeds the magnitude of the battery voltage.

11. The protection circuit of claim 10, wherein the silicon-controlled rectifier provides a path from at least one tip lead or ring lead to ground in response to receiving at least one control signal from at least one of the plurality of control circuits.

12. The protection circuit of claim 11, wherein the silicon-controlled rectifier provides a path from the tip leads or the ring leads to ground in response to receiving a control signal at a voltage that has a magnitude that exceeds a magnitude of an internal reference voltage of the silicon-controlled rectifier.

* * * * *